US012752700B2

(12) United States Patent
Alvear et al.

(10) Patent No.: US 12,752,700 B2
(45) Date of Patent: Oct. 6, 2026

(54) INTERIOR EQUIPMENT FOR A MOTOR VEHICLE HAVING A LIGHTING MODULE WITH A FLEXIBLE GUIDE SHEET

(71) Applicant: VALEO VISION, Bobigny (FR)

(72) Inventors: Eduardo Alvear, Bobigny (FR); Sidahmed Beddar, Bobigny (FR); Hafid El-Idrissi, Bobigny (FR); Benoit Delande, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/867,314

(22) PCT Filed: May 31, 2023

(86) PCT No.: PCT/EP2023/064617
§ 371 (c)(1),
(2) Date: Nov. 19, 2024

(87) PCT Pub. No.: WO2023/232908
PCT Pub. Date: Dec. 7, 2023

(65) Prior Publication Data
US 2025/0368129 A1 Dec. 4, 2025

(30) Foreign Application Priority Data
May 31, 2022 (FR) ....................................... 2205240

(51) Int. Cl.
*B60Q 3/62* (2017.01)
*B60K 35/10* (2024.01)
(Continued)

(52) U.S. Cl.
CPC ................ *B60Q 3/62* (2017.02); *B60K 35/10* (2024.01); *B60K 35/22* (2024.01); *B60K 35/81* (2024.01);
(Continued)

(58) Field of Classification Search
CPC ............. B60Q 3/62; B60Q 3/82; G02B 6/006
See application file for complete search history.

(56) References Cited

U.S. PATENT DOCUMENTS 8,920,016 B2 12/2014 Hamada et al.
10,055,039 B2 8/2018 Myers et al.
(Continued)

FOREIGN PATENT DOCUMENTS

DE 102018208284 A1 11/2019
DE 102018113369 A1 12/2019
(Continued)

OTHER PUBLICATIONS

European Patent Office, International Search Report (with English translation) and Written Opinion of corresponding PCT Application No. PCT/EP2023/064617, dated Oct. 11, 2023.
(Continued)

*Primary Examiner* — Keith G. Delahoussaye
(74) *Attorney, Agent, or Firm* — Valeo Vision

(57) ABSTRACT

The invention relates to interior equipment for a motor vehicle, the equipment including an outer surface on which a lighting luminous module is arranged. The lighting luminous module includes an assembly of at least one flexible guide sheet, each flexible guide sheet of the assembly being suitable for receiving light rays at least at one edge of the flexible guide sheet and for reflecting the light rays in a direction substantially normal to a surface of the flexible guide sheet according to at least one pattern etched in the flexible guide sheet. The lighting luminous module also includes at least one light injection element suitable for receiving light and distributing the light in the assembly of flexible guide sheets and at least one light source suitable for injecting light into the light injection element.

20 Claims, 5 Drawing Sheets

(51) Int. Cl.

| | |
|---|---|
| ***B60K 35/22*** | (2024.01) |
| ***B60K 35/81*** | (2024.01) |
| ***B60K 37/10*** | (2024.01) |
| ***B60Q 3/82*** | (2017.01) |
| ***F21V 8/00*** | (2006.01) |

(52) U.S. Cl.

CPC ................ *B60K 37/10* (2024.01); *B60Q 3/82* (2017.02); *G02B 6/0036* (2013.01); *G02B 6/006* (2013.01); *G02B 6/0068* (2013.01); *G02B 6/0075* (2013.01); *G02B 6/0076* (2013.01); *G02B 6/0078* (2013.01)

(56) References Cited

U.S. PATENT DOCUMENTS

| | | | | |
|---|---|---|---|---|
| 10,288,800 | B1 | 5/2019 | Keranen et al. | |
| 11,137,665 | B2 | 10/2021 | Kakkar et al. | |
| 2003/0046842 | A1* | 3/2003 | Maas | G02B 6/0091 40/546 |
| 2010/0142183 | A1* | 6/2010 | Lerenius | G02B 6/0003 362/85 |
| 2011/0277361 | A1 | 11/2011 | Nichol et al. | |
| 2013/0336004 | A1* | 12/2013 | Mulder | B60Q 3/217 362/609 |
| 2016/0306098 | A1* | 10/2016 | Fujita | G02B 6/0036 |

FOREIGN PATENT DOCUMENTS

| | | | |
|---|---|---|---|
| JP | 2011-237692 | A | 11/2011 |
| JP | 2014-535086 | A | 12/2014 |
| JP | 2019-512147 | A | 5/2019 |
| JP | 2021-160-386 | A | 10/2021 |
| JP | 2022-508298 | A | 1/2022 |
| WO | 2011130715 | A2 | 10/2011 |

OTHER PUBLICATIONS

Japan Patent Office, Office Action (with English Translation) of corresponding Japanese Patent Application No. 2024-570793, dated Oct. 31, 2025, 16 pages.

Japan Patent Office, Search Report (with English Translation) of corresponding Japanese Patent Application No. 2024-570793, dated Oct. 31, 2025, 55 pages.

* cited by examiner

INTERIOR EQUIPMENT FOR A MOTOR VEHICLE HAVING A LIGHTING MODULE WITH A FLEXIBLE GUIDE SHEET

TECHNICAL FIELD

The present invention relates to the field of luminous modules of interior equipment for an automotive vehicle, in particular luminous modules with a light guide. The invention applies in particular, but not exclusively, to the display of light patterns on interior equipment for an automotive vehicle.

BACKGROUND OF THE INVENTION

These days it is common to display light patterns inside an automotive vehicle, in order to convey information, for esthetic customization purposes or to create ambiance.

It is also preferable to display such patterns with a high resolution.

To this end, it is known practice to use screens, such as LCD screens.

However, this technology is not only expensive but also sensitive to environmental conditions such as temperature, humidity or UV radiation.

Furthermore, it is preferable to have a flexible luminous module in order to facilitate its integration into any type of equipment. This is particularly the case inside an automotive vehicle, in which the interior equipment has non-flat surfaces.

There are moreover significant space constraints inside an automotive vehicle, and it is important to provide luminous modules that are compact.

Lastly, the abovementioned solutions have the disadvantage of high energy consumption, which is all the greater the larger the surface area of the equipment in which a luminous module is to be integrated.

SUMMARY OF THE INVENTION

There is therefore a need for interior equipment for an automotive vehicle comprising a luminous module adapted to display a precise light pattern, and which is robust, inexpensive, energy-efficient, compact and easy to integrate.

The present invention improves the situation.

To this end, a first aspect of the invention relates to interior equipment for an automotive vehicle, the equipment comprising an external surface on which a luminous module is arranged, the luminous module comprising:

- an assembly of at least one flexible guide sheet, each flexible guide sheet of the assembly being adapted to receive light rays via at least one edge of said flexible guide sheet and to reflect the light rays in a direction substantially normal to a surface of the flexible guide sheet according to at least one pattern etched in said flexible guide sheet;
- at least one light injection element adapted to receive light and to distribute the light in the assembly of at least one flexible guide sheet;
- at least one light source adapted to inject light into said at least one light injection element.

The use of a flexible guide sheet makes it easier to integrate the luminous module into interior equipment for an automotive vehicle, and is also compact, since the luminous module can have a small thickness. Additionally, it is possible to illuminate large surface areas while limiting the number of light sources used.

According to embodiments, the interior equipment may further comprise a touch-sensitive layer adapted to receive a touch input from a user, and the touch-sensitive layer may be located between the external surface of the equipment and the luminous module, or under the external surface of the equipment.

Thus, the luminous module may be coupled with a touch-sensitive layer to receive touch inputs from the vehicle user, thereby optimizing the use of the constrained space inside an automotive vehicle.

In addition, the touch-sensitive layer may be a capacitive layer.

Such capacitive layers have good impact resistance.

According to embodiments, the interior equipment may further comprise a control element adapted to control said at least one light source.

This makes it possible to manage the light source and thus vary the pattern displayed by the luminous module. Luminous animations or dynamic information may thus be displayed.

In addition, the control element may be adapted to receive touch input data from the touch-sensitive layer and may be configured to control said at least one light source as a function of the touch input data.

The touch-sensitive layer is thus used to manage the display of the pattern of the luminous module, which makes it possible to provide the user with luminous feedback on their touch inputs.

In addition, the luminous module may be adapted to display at least one symbol in a given area of the luminous module on the basis of the pattern of each flexible guide sheet of the assembly, and a touch-sensitive area of the touch-sensitive layer opposite the given area of the luminous module may be adapted to receive a touch input to generate touch input data as a function of said touch-sensitive area.

This makes it easier for the user to ensure their touch inputs are precise, since luminous feedback is provided in the touch-sensitive area where the touch input takes place.

In addition, the luminous module may be adapted to display at least a first symbol in a first given area of the luminous module and at least a second symbol in a second given area of the luminous module, on the basis of the pattern of each flexible guide sheet of the assembly, and a first touch-sensitive area of the touch-sensitive layer may be opposite the first given area of the luminous module and a second touch-sensitive area of the touch-sensitive layer may be opposite the second given area of the luminous module, a first touch input datum may be generated by the touch-sensitive layer upon receipt of a first touch input in the first touch-sensitive area, and a second touch input datum may be generated by the touch-sensitive layer upon receipt of a second touch input in the second touch-sensitive area.

This means that several different touch inputs can be entered by the user via the same equipment, allowing for more complex functionalities.

According to embodiments, the luminous module may comprise a flexible guide sheet, a light injection element and a light source, the light source may be adapted to project light in a first wavelength range and in a second wavelength range distinct from the first range, said control element being adapted to control the light source to project light in the first range or in the second range.

Thus, the equipment is adapted to be controlled dynamically to vary the color of the pattern projected.

In addition, the control element may be adapted to control the light source to project light in the first range or in the second range as a function of an animation command.

Luminous animations for ambiance or dynamic information may thus be displayed.

In addition or as an alternative, the control element may be adapted to control the light source to project light in the first range or in the second range as a function of the touch input data.

Thus, the color of the pattern depends on the user's touch input, which enriches the interactions allowed with the user.

According to a first embodiment or a second embodiment, the luminous module may comprise a single flexible guide sheet.

Thus, a simple, inexpensive luminous module may be used while displaying a light pattern on a large and potentially non-flat surface.

Alternatively, according to the second embodiment or according to a third or fourth embodiment, the luminous module may comprise a first injection element and a second injection element, said at least one source may be adapted to selectively inject light into the first injection element and into the second injection element, and the first light injection element and the assembly of at least one flexible guide sheet may be arranged in such a way as to project light according to the first pattern and wherein the second light injection element and the assembly of at least one flexible guide sheet are arranged in such a way as to project light according to the second pattern.

Thus, the first injection element and the second injection element may be used separately, which allows animations by color variation or by spatial variation of the light rays emitted by the assembly.

In addition, the luminous module of the interior equipment may comprise a first light source adapted to inject light into the first light injection element and a second light source adapted to inject light into the second light injection element.

Control of a dynamic display is thus made possible by managing the sources, which are activated independently of one another.

Further in addition, the first light source may be adapted to generate light in a first wavelength range and the second light source may be adapted to generate light in a second wavelength range, different to the first range.

This makes it possible to vary the color of the displayed pattern(s) dynamically.

According to the second embodiment, the first injection element may be arranged in such a way as to inject light into a first section of the edge of the guide sheet of the assembly, and the second injection element may be arranged in such a way as to inject light into a second section of the edge of the flexible guide sheet, a first portion of the flexible guide sheet located opposite the first section of the edge being etched according to the first pattern, and a second portion of the flexible guide sheet located opposite the second section of the edge being etched according to the second pattern.

This makes it possible to produce several patterns at distinct spatial positions, via a single flexible guide sheet, which limits the costs and space requirements associated with the luminous module.

Alternatively, according to the third and fourth embodiments, the assembly may comprise at least a first and a second flexible guide sheets, the first pattern being etched in the first flexible guide sheet and the second pattern being etched in the second flexible guide sheet, the first injection element being arranged in such a way as to inject light into an edge of the first flexible guide sheet and the second injection element being arranged in such a way as to inject light into an edge of the second flexible guide sheet.

This makes it possible to create complex variations of patterns and/or to provide a luminous module covering a large illumination surface area.

In addition, according to the third embodiment, the first and second guide sheets may be superimposed in the luminous module, in order to project the first and second patterns in a common area of the luminous module.

This makes it possible to vary the pattern projected in the common area. Animation may be produced by dynamically varying the pattern of the common area or changing its color.

Moreover, since the flexible guide sheets are thin, they may be superimposed without taking up significant space, which is particularly advantageous in constrained environments such as the interior of an automotive vehicle.

Alternatively, according to the fourth embodiment of the invention, the first and second guide sheets may be placed next to one another in such a way as to project the first and second patterns at distinct positions.

This makes it possible to cover large emission surface areas, particularly greater than 100 cm2, while allowing integration on irregular and complex surfaces.

In addition, the luminous module of the interior equipment may comprise more than two flexible guide sheets placed next to one another in such a way as to form a matrix of flexible guide sheets, each flexible guide sheet being associated with a light injection element adapted to inject light into an edge of the flexible guide sheet and each flexible guide sheet having at least one pattern etched in said sheet.

This makes it possible to create complex light animations by spatial variation of the projected light rays, while allowing easy integration into equipment with complex surfaces.

In addition, in the fourth embodiment, the flexible guide sheets of the assembly may have the same square or rectangular shape.

Manufacturing of the luminous module is thus simplified and the associated costs are reduced.

In addition, in the fourth embodiment, a dimension of the shape of the guide sheets may be between 3 and 25 cm, in particular between 3 and 5 centimeters.

Thus, the matrix elements that are the flexible guide sheets are of small size, which makes it possible to produce a luminous module with a large number of flexible guide sheets. This allows many patterns to be displayed and therefore complex light animations to be created.

In addition, according to the second, third or fourth embodiment, the control element may be adapted to control said at least one source in order to selectively project light according to the first pattern and according to the second pattern.

Thus, a single element is able to control the injection of light selectively into the various light injection elements of the luminous module, which improves the synchronization of the display of the light patterns relative to one another.

In addition, the control element may be adapted to dynamically control said at least one source in such a way as to produce a light animation comprising at least the first and second patterns.

This makes it easier to create light animations from the patterns.

According to the embodiments of the invention, the interior equipment may be an automotive vehicle dashboard.

It is thus possible to display information or to create a luminous ambiance for the front passengers of the vehicle. It is particularly important to disseminate information to the driver and even allow interaction with the driver. Moreover, a dashboard comprises non-flat surfaces, and the use of a luminous module with a flexible guide sheet is therefore particularly advantageous.

In addition, the dashboard may comprise an inflatable safety device under the external surface of the dashboard.

Since the luminous module comprises a flexible guide sheet, it deforms or tears easily, which allows the inflatable safety device to be deployed in the event of an impact. Both lighting/signaling and safety functions may thus be integrated into the same equipment.

Alternatively, the interior equipment may be an automotive vehicle seat, an automotive vehicle roof or an automotive vehicle rear shelf.

This equipment may all have non-flat surfaces and/or impose significant compactness constraints.

According to the embodiments of the invention, each flexible guide sheet of the assembly may have a thickness of between 0.2 and 1 mm.

Such a thickness allows the flexible guide sheet to be highly flexible, and facilitates its integration, particularly on curved supports.

According to the embodiments of the invention, at least one flexible guide sheet of the assembly may be made of a transparent material.

This increases the possibilities for integration of the luminous module, as well as its esthetic appearance. Note that at least one of the flexible guide sheets may be semi-transparent or opaque.

In addition, each flexible guide sheet in the assembly may comprise a polycarbonate (PC), polymethyl methacrylate (PMMA), thermoplastic polyurethane (TUP) or polyethylene terephthalate (PET) film.

Such materials make it possible to produce a transparent and flexible guide sheet.

According to the embodiments of the invention, each flexible guide sheet may comprise a film comprising microstructures, in which each pattern of the first and second patterns is etched by ultraviolet printing of the microstructures of the film.

Such microstructures make it possible to produce high-resolution patterns while maintaining a high level of transparency of the flexible guide sheet.

In addition, for each flexible guide sheet, a surface density of microstructures may decrease with the distance from the edge of the guide sheet into which the light is injected.

The homogeneity of a pattern projected by the flexible guide sheet is thus improved.

According to the embodiments of the invention, each injection element may comprise a plurality of injection guides, each injection guide being adapted to receive light from one end of the guide and to guide the light to a given longitudinal position on the injection element, the longitudinal positions of the injection guides all being different so as to distribute the light longitudinally in the injection element.

This allows light to be distributed homogeneously in the edge of the flexible guide sheet, which improves the quality of projection of the first and second patterns.

BRIEF DESCRIPTION OF DRAWINGS

Other features and advantages of the invention will become apparent on examining the following detailed description and the appended drawings, in which.

DETAILED DESCRIPTION OF THE INVENTION

The description concentrates on the features that differentiate the interior equipment or the luminous module from those known in the prior art.

Figure 1:
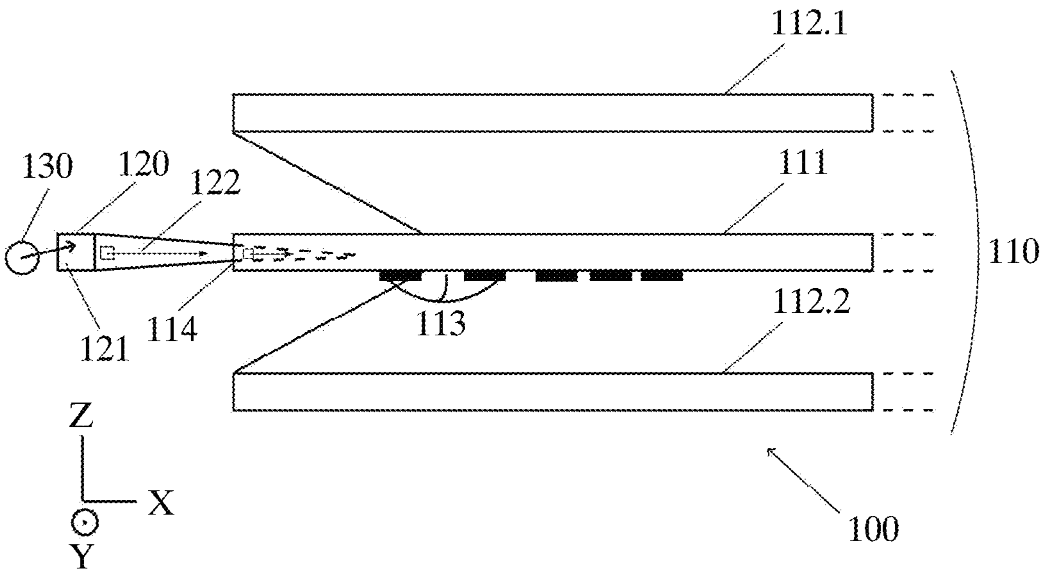
FIG. 1 depicts a luminous module of interior equipment for an automotive vehicle, according to a first embodiment of the invention.

FIG. 1 shows a luminous module 100 of an automotive vehicle, according to a first embodiment of the invention.

The luminous module 100 comprises a flexible guide sheet 110 adapted to receive light rays via an edge 114 and to reflect the light rays in a direction Z substantially normal to a surface of the flexible guide sheet which thus extends in a plane X-Y in FIG. 1.

Guide sheet is understood to mean an optical guide element of which one of the dimensions is much smaller than the other two dimensions in space, for example smaller by one or more orders of magnitude. As shown in FIG. 1, in this case it is a flexible guide sheet the thickness of which along the Z axis is at least two orders of magnitude smaller than its dimensions in the plane X-Y in which the flexible guide sheet 110 extends.

The flexible guide sheet 110 may comprise a flexible film 111 at its core comprising at least one edge 114, being adapted to guide the light rays in an overall direction X, and comprising a set of microstructures 113 adapted to reflect the light rays guided in the flexible film 111 outside the flexible guide sheet 110, in particular in one or more directions substantially along the axis Z.

The flexible film 111 may be a substrate film made of polycarbonate (PC), polymethyl methacrylate (PMMA), thermoplastic polyurethane (TUP) or polyethylene terephthalate (PET). The flexible film 111 may have a thickness, that is a dimension along the axis Z, of between 12 and 1000 micrometers. More specifically, the thickness of the flexible film 111 may be between 50 and 1000 micrometers, for example between 200 and 500 micrometers. Alternatively, it is the flexible guide sheet 110 which has a thickness of between 200 and 1000 micrometers.

The abovementioned materials, combined with a low thickness as described above, make it possible to obtain a flexible film 111. Other materials may be considered for the composition of the flexible film 111. However, it is preferable according to the invention to provide deformable, transparent materials.

A thin coating of microstructures 113 may be applied to one of the faces of the flexible film 111, or be integrated in the flexible film 111. The microstructure coating 113 may in particular have a thickness along the axis Z of less than 20 micrometers.

Such microstructures 113 may generally take the form of a bump, on which the light rays are reflected in a direction substantially along the axis Z. Such microstructures 113 may be adapted such that the light rays exiting the flexible film

111 form a pattern. To this end, the microstructures 113 may be etched by ultraviolet printing, according to the desired pattern.

Microstructures 113 are structures, or irregularities of the flexible film, with dimensions of under a few micrometers. Microstructures thus also cover nanometric structures. Such sizes of microstructures 113 make it possible to ensure high transparency of the flexible film 111. In particular, a transparency of the order of 97% may be obtained in practice by the use of microstructures 113. Alternatively, the flexible guide sheet may be semi-transparent or opaque.

Advantageously, the microstructures 113 may be distributed along the axis X such that a linear density of microstructures 113 is proportional to the distance from the edge 114 via which the light rays injected by the injection element 120 are received. In other words, the further the microstructures 113 are from the edge 114, the more densely they are grouped together. Such a distribution advantageously makes it possible to ensure a homogeneous distribution along the axis X of the luminous intensity of the pattern emitted by the flexible guide sheet 110.

The flexible guide sheet 110 may further comprise one or two optional protective layers 112.1 and 112.2, which make it possible to mechanically protect the flexible film 111. Furthermore, at least one of the protective layers 112.1 and 112.2 may comprise an anti-UV treatment, making it possible to protect the flexible film against UV rays, once the microstructures 113 have been etched. Without such UV protection, the pattern projected by the flexible guide sheet 110 is likely to deteriorate over time, particularly when exposed to sunlight.

The flexible film 111 and the protective layers 112.1 and 112.2 are shown spaced apart in FIG. 1, purely for illustrative purposes. It will be understood, however, that the protective layers 112.1 and 112.2 may be attached to the flexible film, in particular by lamination.

Since the guide sheet 110 is flexible, it is not necessarily included in a plane but may be curved, depending on the position in which it is placed and the mechanical constraints applied to it.

The luminous module 100 shown in FIG. 1 also comprises a light injection element 120, also referred to as a light bar, because it extends longitudinally in a direction Y, and adapted to inject light in a direction normal to its longitudinal direction, for example along the axis X when it is arranged in the manner shown in FIG. 1.

The light injection element 120 has a rectangular or square section in FIG. 1. However, the light injection element 120 may have a round, oval, or polygonal section.

Thus, the light injection element 120 comprises an output surface 122 extending in the longitudinal direction and adapted to inject light in a direction substantially normal to the output surface 122. The light injection element 120 further comprises an input surface 121, at one end of the light injection element 120, adapted to receive light rays from a light source 130, and the light injection element 120 is adapted to guide the light longitudinally along the axis Y, distributing it over the output surface 122. The distribution of light by the output surface 122 will be understood more clearly from the description of FIG. 2.

No restriction is imposed on the light source 130. The light source 130 may be adapted to generate light in a wavelength range. Such a range may be centered around a visible color, in order to generate colored light, for example blue, red or green. Alternatively, the light source 130 may emit light rays across the entire range of wavelengths visible to the human eye, in such a way as to generate white light. A very narrow wavelength range may be produced by a laser type light source 130.

The light source 130 may be adapted to generate light in at least two distinct wavelength ranges, for example corresponding to two distinct colors. It may for example be a light-emitting source of LED type for example, having the advantage of small size, low energy consumption and of not heating up very much, producing two different colors of light, adapted to be controlled by a control element (not shown). It may in particular be an RGB type diode, adapted to produce red, green and blue light. Thus, the luminous module according to the first embodiment may comprise a flexible guide sheet 110, an injection element 120 and a light source 130 adapted to generate light in at least two distinct wavelength ranges.

The light source 130 may be controlled by a control element (not shown but described below), in order to vary the color projected and thus create a light animation. Alternatively, the color may be controlled dynamically as a function of touch input data received by the control element, as will be understood more clearly from the description of FIG. 6.

Alternatively, the light source 130 is not arranged directly opposite the input surface 121 of the injection element 120, but the luminous module 100 further comprises an optical fiber placed between the source 130 and the injection element 120, which makes it possible to move the source 130 away from the assembly formed by the injection element 120 and the flexible guide sheet 110.

Figure 2:
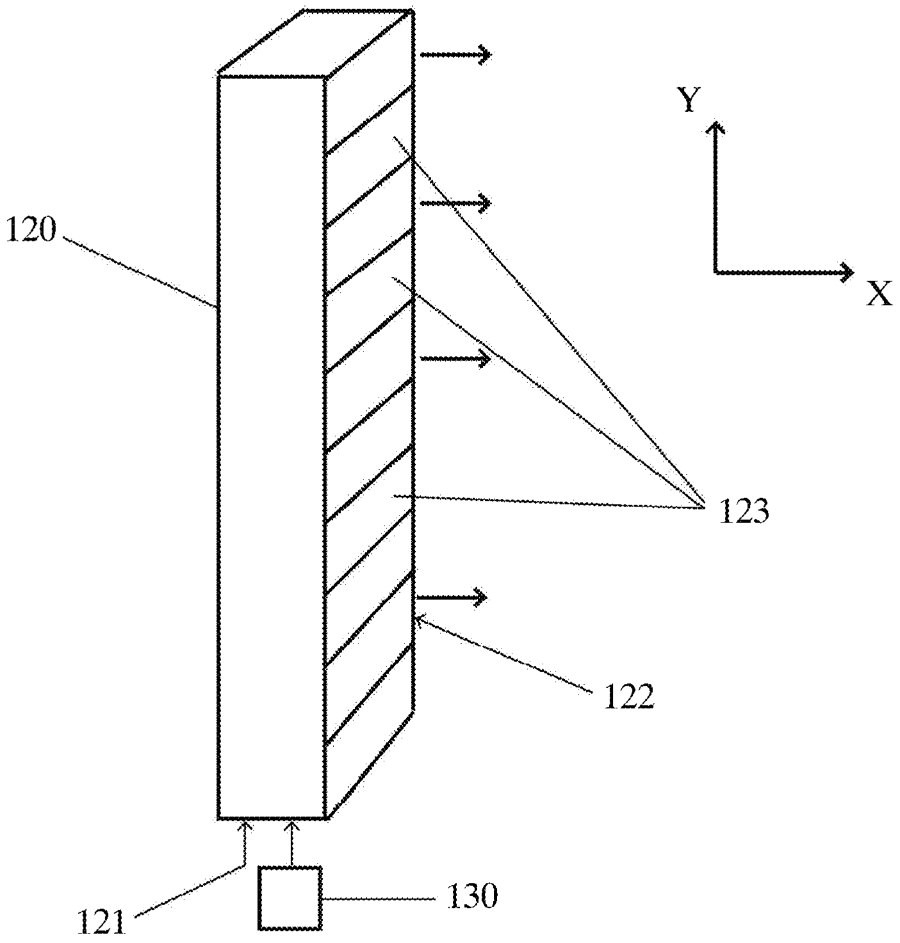
FIG. 2 depicts an injection element of a luminous module according to an embodiment of the invention.

FIG. 2 shows an injection element 120 of a luminous module according to embodiments of the invention.

The injection element 120 may comprise a plurality of injection guides 123 adapted to receive light from the source 130 via the input surface 121 and to guide the light to a longitudinal position on the output surface 122, the longitudinal positions of the light guides being distinct in such a way as to distribute the light to at least several longitudinal positions on the output surface 122.

This makes it possible to inject light at different longitudinal positions along the axis Y on the edge 114. Each longitudinal position on the edge 114 may correspond to a guide line of the flexible film 111, adapted to guide the light along the axis X along such a guide line.

Such a combination of a flexible guide sheet 110, an injection element 120 and a source 130 thus makes it possible to project light in the direction Z via a flexible, transparent, semi-transparent or opaque surface, with good surface homogeneity and according to a given pattern.

In practice, such a luminous module may make it possible to emit a pattern with a brightness of between 100 and 1000 candelas per square meter, with a light extraction efficiency that may range between 25% and 80%.

Details on the structure and arrangement of these elements 110, 120 and 130 are described further in the international patent application published under number WO2011130715A2.

A luminous module of interior equipment for a vehicle according to the invention comprises:

- an assembly of at least one guide sheet, such as the flexible guide sheet 110 shown in FIG. 1, the assembly being adapted to reflect light according to at least one pattern;
- at least one light injection element, such as the injection element 120 described with reference to FIGS. 1 and 2; and at least one light source, such as the light source 130 described above with reference to FIG. 1, adapted to inject light into said at least one injection element.

"Pattern" means any predefined spatial distribution of the luminous intensity emitted by the luminous module. In particular, reference is made here to a two-dimensional or one-dimensional pattern. A pattern may thus comprise a two-dimensional shape or symbol obtained by contrast between the luminous intensities of different positions in the plane X-Y of the flexible guide sheet 110. The pattern may also include several shapes or symbols. Alternatively, a pattern covers a predefined, or intentional, spatial distribution of luminous intensity that does not cause any general shape to appear, such as a distribution resulting in a cloud of luminous dots. In the context of the present invention, a pattern is formed by injecting light into an injection element which is arranged relative to a flexible guide sheet in such a way as to form the pattern on the flexible guide sheet. A flexible guide sheet is thus adapted to project light according to at least one pattern, and a pattern may correspond to at least one shape or symbol. A flexible guide sheet may also project light according to at least two patterns, when the flexible guide sheet is combined with several injection elements.

In the first embodiment, the luminous module comprises a single source, a single injection element and a single flexible guide sheet adapted to form a pattern.

In the second, third and fourth embodiments below, the luminous module comprises at least two injection elements similar to the injection element 120 described above. The embodiments may vary by the number of elements that the luminous module comprises, and by their respective arrangements. However, the descriptions and definitions given above of the light source, the injection element and the flexible guide sheet apply to all of the embodiments.

Figure 3:
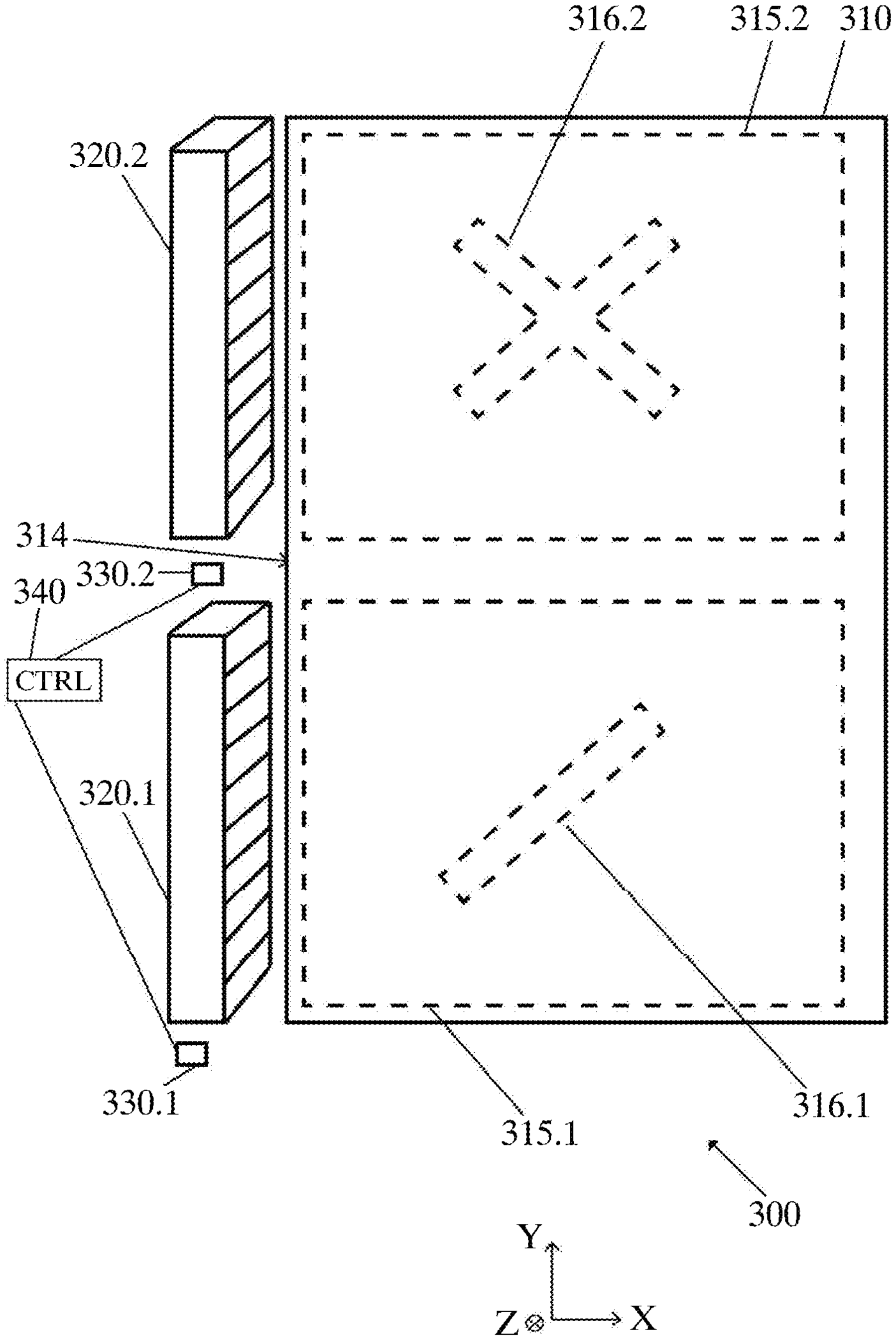
FIG. 3 depicts a luminous module of interior equipment for an automotive vehicle, according to a second embodiment of the invention.

FIG. 3 shows a luminous module 300 according to a second embodiment of the invention.

In the second embodiment, several injection elements are arranged in such a way as to inject light into one and the same flexible guide sheet, comprising several patterns.

In particular, in the example of FIG. 3, a first injection element 320.1 and a second injection element 320.2 are arranged in such a way as to inject light into an edge 314 of a flexible guide sheet 310.

The first and second injection elements 320.1 and 320.2 may be similar to the injection element 120 described with reference to FIGS. 1 and 2. Similarly, the flexible guide sheet 310 may correspond to the flexible guide sheet 110 described above.

As shown in FIG. 3, the first injection element 320.1 and the second injection element 320.2 are arranged in such a way as to inject light into the edge 314, at distinct longitudinal positions, along the axis Y.

Note that, because it is flexible, the guide sheet 310 may not be flat but may be curved. FIG. 3 thus shows the luminous module 300 when the guide sheet is flat, for example placed on a flat rigid support.

The first injection element 320.1 is thus adapted to inject light into the edge 314, which light is then guided by the flexible guide sheet 310 into a first portion 315.1 of the flexible guide sheet 310. The second injection element 320.2 is adapted to inject light into the edge 314, which light is then guided into a second portion 315.2 of the flexible guide sheet 310.

For this purpose, a first source 330.1 is arranged opposite an input surface of the first injection element 320.1 in such a way as to propagate light rays inside the first injection element 320.1 and therefore toward the first portion 315.1 of the flexible guide sheet 310. A second source 330.2 is arranged opposite an input surface of the second injection element 320.2 in such a way as to propagate light rays inside the second injection element 320.2 and therefore towards the second portion 315.2 of the flexible guide sheet 310.

Alternatively, a single source may be provided and the luminous module 300 comprises a first optical fiber adapted to convey light from the single source to the input surface of the first injection element 320.1 and a second optical fiber adapted to convey light from the single source to the input surface of the second injection element 320.2.

The first and second sources 330.1 and 330.2, or the single source, may selectively inject into the first injection element 320.1 and/or into the second injection element 320.2. Such selective injection may be controlled by a control element 340 connected to the two sources 330.1 and 330.2, or controlling the power supply to the two sources 330.1 and 330.2.

A first pattern 316.1 is etched in the first portion 315.1 while a second pattern 316.2 is etched in the second portion 315.2. The selective injection of light into the first injection element 320.1 and/or into the second injection element 320.2 thus makes it possible to project the first pattern, the second pattern, neither of the patterns or both patterns at the same time, thus making it possible, by dynamic control, to produce an animation from at least the first and second patterns, or to display dynamic luminous information. Alternatively, the selective injection of light may be controlled dynamically as a function of touch input data received by the control element 340, as will be understood more clearly from the description of FIG. 6.

In the example of FIG. 3, the first and second patterns 316.1 and 316.2 each correspond to a symbol, the symbols being distinct. However, in line with the definition of "pattern" given above, the patterns may be any intentional, or predetermined, spatial distribution of luminous intensity. Furthermore, where the patterns are shapes or symbols, the first and second patterns 316.1 and 316.2 may have identical shapes. Animation is then enabled by the spatial movement of the pattern from the first portion 315.1 to the second portion 315.2, or vice versa. Furthermore, the colors respectively projected for each pattern may vary, when the sources 330.1 and 330.2 produce light of different colors.

An example with two patterns and two injection elements was shown in FIG. 3. However, the first embodiment also covers a luminous module with a flexible guide sheet with three or more portions, each portion comprising an etched pattern, and with at least three injection elements, each injection element being placed opposite one of the portions.

Dedicated sources for each injection element may be provided for this purpose, or a single source with several optical fibers may be provided for this purpose.

Figure 4:
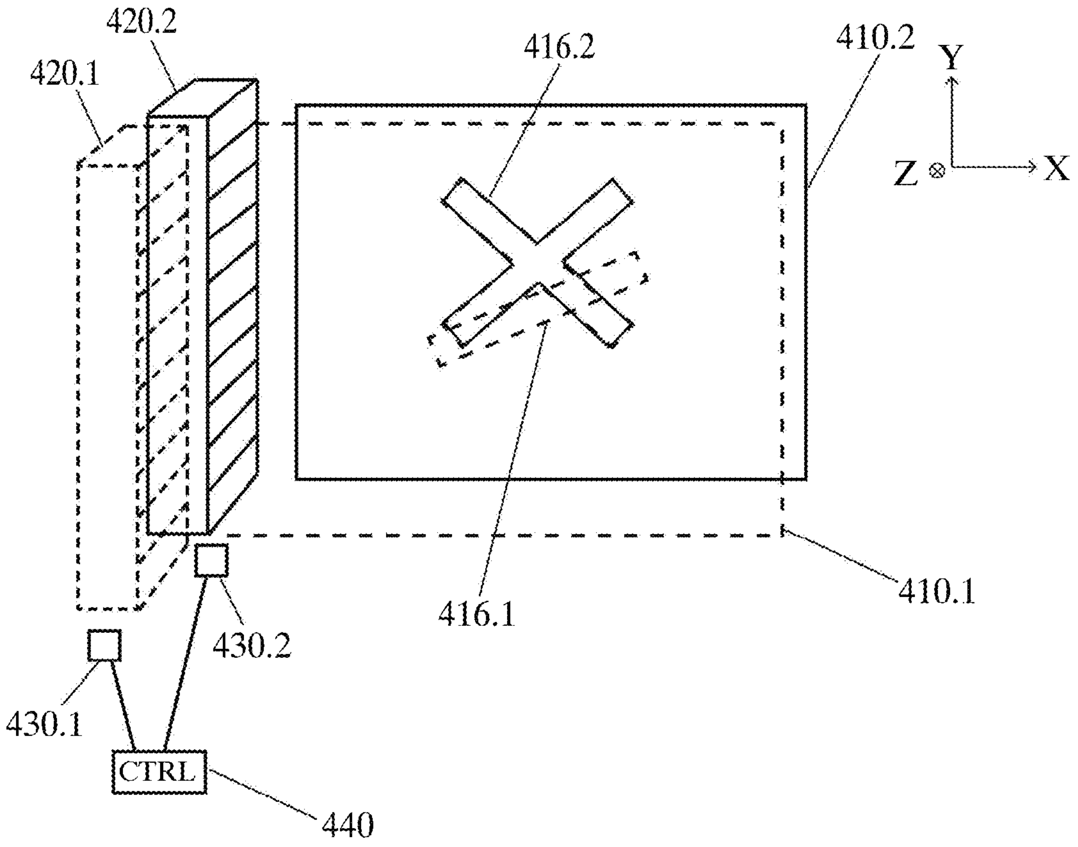
FIG. 4 depicts a luminous module of interior equipment for an automotive vehicle, according to a third embodiment of the invention.

FIG. 4 shows a luminous module 400 according to a third embodiment of the invention.

In the third embodiment of the invention, the luminous module 400 comprises at least a first flexible guide sheet 410.1 and a second flexible guide sheet 410.2, the two flexible guide sheets being superimposed, which means that at least a portion of the first flexible guide sheet 410.1, in the plane X-Y, is superimposed with at least a portion of the second flexible guide sheet 410.2, in a common area, which corresponds to a set of positions in the plane X-Y.

Preferably, the first and second flexible guide sheets 410.1 and 410.2 have the same dimensions in the plane X-Y, and are completely superimposed.

Note that, because they are flexible, the guide sheets may not be flat but may be curved. FIG. 4 thus shows the luminous module 400 when the guide sheets are flat, for example stacked on a flat support.

Such superposition is particularly advantageous because the flexible guide sheets are preferably transparent as stated above.

Thus, the first and second flexible guide sheets 410.1 and 410.2 are adapted to project respectively a first pattern 416.1 and a second pattern 416.2 in a common area.

A first injection element 420.1 is arranged to inject light into an edge of the first flexible guide sheet 410.1 and a second injection element 420.2 is adapted and arranged to inject light into an edge of the second guide sheet 410.2.

For this purpose, a first source 430.1 is arranged opposite an input surface of the first injection element 420.1 in such a way as to propagate light rays inside the first injection element 420.1 and therefore toward the first flexible guide sheet 410.1. A second source 430.2 is arranged opposite an input surface of the second injection element 420.2 in such a way as to propagate light rays inside the second injection element 420.2 and therefore toward the second flexible guide sheet 410.2.

Alternatively, a single source may be provided and the luminous module comprises a first optical fiber adapted to convey light from the single source to the input surface of the first injection element 420.1 and a second optical fiber adapted to convey light from the single source to the input surface of the second injection element 420.2.

The first and second sources 430.1 and 430.2, or the single source, may selectively inject into the first injection element 420.1 and/or into the second injection element 420.2. Such selective injection may be controlled by a control element 440 connected to the two sources 430.1 and 430.2, or controlling the power supply to the two sources 430.1 and 430.2.

The first pattern 416.1 is etched in the first flexible guide sheet 410.1 while the second pattern 416.2 is etched in the second flexible guide sheet 410.2. The selective injection of light into the first injection element 420.1 and/or into the second injection element 420.2 thus makes it possible to project the first pattern, the second pattern, neither of the patterns or both patterns at the same time, thus making it possible, by dynamic control, to produce an animation from at least the first and second patterns. Alternatively, the selective injection of light may be controlled dynamically as a function of touch input data received by the control element 440, as will be understood more clearly from the description of FIG. 6.

In the example of FIG. 4, the first and second patterns 416.1 and 416.2 have distinct symbols, and are identical to the patterns 316.1 and 316.2 of FIG. 3, for illustrative purposes. However, in line with the definition of a pattern given above, the patterns may be any intentional, or predetermined, spatial distribution of luminous intensity. Furthermore, where the patterns are shapes or symbols, the first and second patterns 416.1 and 416.2 may have identical symbols but distinct colors. To be specific, the colors respectively projected for each pattern may vary, when the sources 430.1 and 430.2 produce light of different colors.

An example with two patterns, two injection elements and two flexible guide sheets was shown in FIG. 4. However, the third embodiment also covers a luminous module with at least three flexible guide sheets with at least three injection elements, each injection element being placed opposite one of the flexible guide sheets. Dedicated sources for each injection element may be provided for this purpose, or a single source with several optical fibers may be provided for this purpose.

At least one of the flexible guide sheets may be transparent. Alternatively, according to the third embodiment, the flexible guide sheet located below the luminous module 400, in other words the first flexible guide sheet 410.1, may be opaque or semi-transparent. Conversely, the second flexible guide sheet 410.2 is transparent or semi-transparent, so as to allow at least part of the light emitted by the first flexible guide sheet 410.2 to pass through. The second flexible guide sheet 410.2 may further comprise a textured material, so as to improve the esthetic appearance of the luminous module and/or to match its material to the material of the interior equipment in which the luminous module is integrated. Such a textured material may also be used for the flexible guide sheets of the luminous modules according to the first, second and fourth embodiments. Textured material means any material having a predefined texture involving, for example, a surface treatment of the flexible guide sheet. The textured material may include grains, ridges or cracks or any other textural element.

Figure 5:
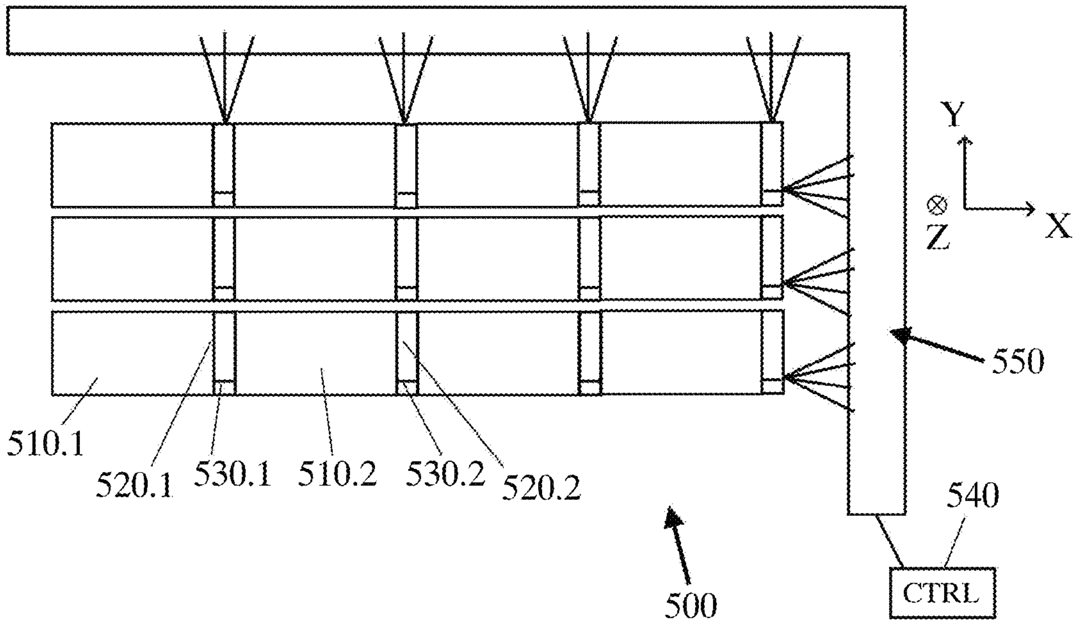
FIG. 5 depicts a luminous module of interior equipment for an automotive vehicle, according to a fourth embodiment of the invention.

FIG. 5 shows a luminous module 500 according to a fourth embodiment of the invention.

In the fourth embodiment of the invention, the luminous module 500 comprises at least a first flexible guide sheet 510.1 and a second flexible guide sheet 510.2, the two flexible guide sheets being placed next to one another, and the two flexible guide sheets are thus adapted to project light rays from distinct positions in the plane X-Y in which the flexible guide sheets mainly extend.

Note that, because they are flexible, the guide sheets may not be flat but may be curved. FIG. 5 thus shows the luminous module 500 when the flexible guide sheets are flat, for example placed on a flat rigid support.

Thus, the first flexible guide sheet 510.1 is adapted to project a first pattern, not shown, at a first position on the plane X-Y, and the second flexible guide sheet 510.2 is adapted to project a second pattern 516.2 at a second position on the plane X-Y, the first and second positions being distinct, for example next to one other. Each pattern projected may include a symbol or part of a symbol. When a pattern of a flexible guide sheet includes part of a symbol, this part may be complementary to another part of a symbol formed by the pattern of another flexible guide sheet, or to other parts of symbols formed by the patterns of other flexible guide sheets.

A first injection element 520.1 is arranged to inject light into an edge of the first flexible guide sheet 510.1 and a second injection element 520.2 is arranged to inject light into an edge of the second guide sheet 510.2.

The relative arrangement of each injection element with respect to a flexible guide sheet is in accordance with the explanations set out above, and is not described in detail again for the fourth embodiment of FIG. 5.

A first source 530.1 is arranged opposite an input surface of the first injection element 520.1 in such a way as to propagate light rays inside the first injection element 520.1 and therefore toward the first flexible guide sheet 510.1. A second source 530.2 is arranged opposite an input surface of the second injection element 520.2 in such a way as to propagate light rays inside the second injection element 520.2 and therefore toward the second flexible guide sheet 510.2.

Alternatively, a single source may be provided and the luminous module 500 comprises a first optical fiber adapted to convey light from the single source to the input surface of the first injection element 520.1 and a second optical fiber adapted to convey light from the single source to the input surface of the second injection element 520.2.

The first and second sources 530.1 and 530.2, or the single source, may selectively inject light into the first injection element 520.1 and/or into the second injection element 520.2. Such selective injection may be controlled by a control element 540 connected to the two sources 530.1 and 530.2, or controlling the power supply to the two sources 530.1 and 530.2. Alternatively, the selective injection of light may be controlled dynamically as a function of touch input data received by the control element 540, as will be understood more clearly from the description of FIG. 6.

The first pattern is etched in the first flexible guide sheet 510.1 while the second pattern is etched in the second flexible guide sheet 510.2. The selective injection of light into the first injection element 520.1 and/or into the second injection element 520.2 thus makes it possible to project the first pattern, the second pattern, neither of the patterns or both patterns at the same time, thus making it possible, by dynamic control, to produce an animation from at least the first and second patterns.

In the example of FIG. 5, a luminous module 500 comprising twelve flexible guide sheets, twelve injection elements and twelve light sources, arranged in a matrix with three rows and four columns, has been shown, purely for illustrative purposes.

No restriction is imposed on the number of flexible guide sheets in the third embodiment. The third embodiment thus applies to N flexible guide sheets, N respectively associated injection elements, and N light sources, or a single source connected by N optical fibers to the N injection elements, N being any integer greater than or equal to 2.

There is also no restriction on the arrangement of the flexible guide sheets relative to one another. When they are positioned in matrices, there is no restriction on the number of rows or the number of columns.

The first and second patterns may have distinct shapes, and may for example be identical to the patterns 316.1 and 316.2 of FIG. 3. However, in line with the definition of "pattern" given above, the patterns may be any intentional, or predetermined, spatial distribution of luminous intensity. Furthermore, where the patterns are shapes or symbols, the first and second patterns may have identical symbols but distinct colors. To be specific, the colors respectively projected for each pattern may vary, when the sources 530.1 and 530.2 produce light of different colors.

Furthermore, as explained above, the patterns may include parts of symbols that are complementary to one another, in such a way as to form one or more symbols over several flexible guide sheets of the matrix.

The flexible guide sheets may be connected to one another by a supporting matrix structure, which may itself be flexible. Alternatively, each flexible guide sheet may be connected to the surrounding flexible guide sheets by fastening means, by adhesive bonding, clamping, clipping, or any other method.

The set of light sources may be controlled by the control element 540, via a set of wires, each wire connecting the control element 540 to a light source. The wires may be carried by a structure 550 making it possible to centralize the wires and to route them to the control element, thus reducing the bulk, and also allowing the wires to be shielded.

No restriction is imposed on the dimensions in the plane X-Y of the flexible guide sheets. For example, each flexible guide sheet may be rectangular or square in shape, with at least one dimension between 2 and 10 cm. For example, the flexible guide sheets are squares or rectangles, with:

- a dimension between 2 cm and 10 cm, for example between 2 cm and 5 cm, for example equal to 5 cm; and
- another dimension between 2 cm and 10 cm, for example between 2 cm and 5 cm, for example equal to 5 cm.

For example, each flexible guide sheet is a 3 cm by 3 cm square.

The second, third and fourth embodiments have been described in a manner exclusive with respect to one another. However, note that these three embodiments may be combined in one and the same luminous module, in particular:

- the second embodiment and the third embodiment may be combined: at least two flexible guide sheets are superimposed, and one of the two flexible guide sheets is associated with two light injection guides adapted to inject light selectively into two distinct portions of the guide sheet, two patterns being respectively etched in the two portions;
- the second embodiment and the fourth embodiment may be combined: at least two flexible guide sheets are placed next to one another, and one of the two flexible guide sheets is associated with two light injection guides adapted to inject light selectively into two distinct portions of the guide sheet, two patterns being respectively etched in the two portions;
- the third embodiment and the fourth embodiment may be combined: at least two flexible guide sheets are placed next to one another, and one of the two flexible guide sheets is superimposed with a third flexible guide sheet of the luminous module;
- the second embodiment, the third embodiment and the fourth embodiment may be combined: at least two flexible guide sheets are placed next to one another, and one of the two flexible guide sheets is superimposed with a third flexible guide sheet of the luminous module, and one of these three flexible guide sheets is associated with two light injection guides adapted to inject light selectively into two distinct portions of the guide sheet, two patterns being respectively etched in the two portions.

Figure 6:
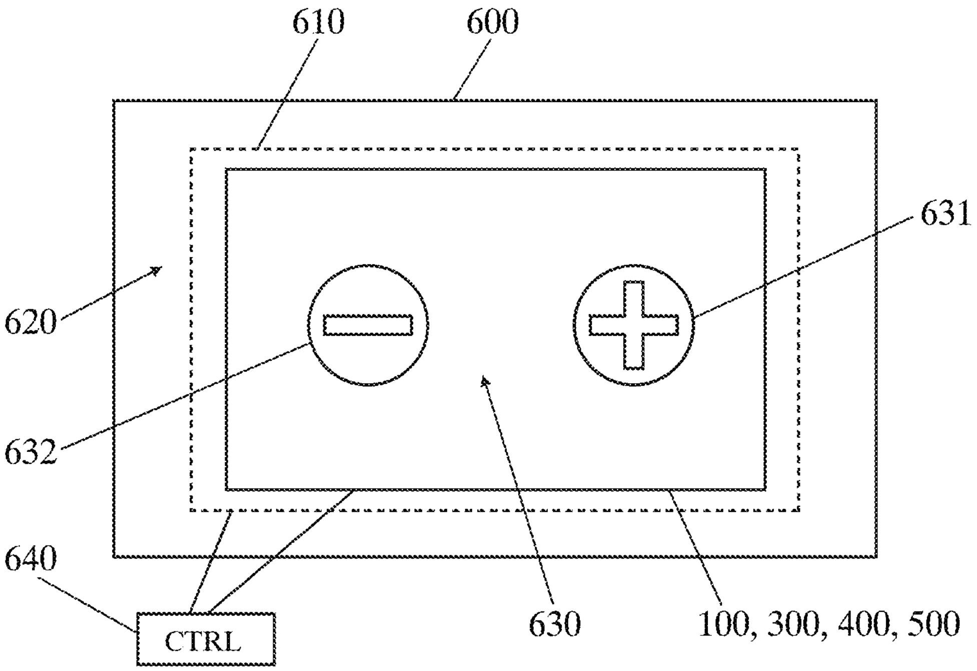
FIG. 6 depicts equipment for an automotive vehicle, according to embodiments of the invention.

FIG. 6 depicts interior equipment 600 for an automotive vehicle according to embodiments of the invention.

The interior equipment 600 according to the invention comprises a luminous module 100, 300, 400, 500 according to one of the embodiments described above, or according to a combination of several of the embodiments described above, as well as an external surface 620 to which the luminous module 100, 300, 400, 500 is attached.

External surface means a surface accessible to a user when the interior equipment is mounted in a vehicle. It is therefore distinguished from an internal surface which is only accessible by removing said equipment, or when the equipment is not mounted in the vehicle.

"Interior" equipment means any equipment comprising at least one external surface intended to be accessible to a user inside the automotive vehicle.

No restriction is imposed on the way in which the luminous module 100, 300, 400, 500 is attached to the external surface 620.

The luminous module 100, 300, 400, 500 may for example be inserted in a frame or a support of the equipment 600, provided for this purpose, having in particular a shape complementary to the luminous module 600, and held in position by adhesive bonding, screwing, clipping, clamping, or any other type of holding means or attachment means.

Alternatively, the luminous module 100, 300, 400, 500 is directly bonded to the external surface 620 of the equipment 600.

The equipment 600 may also comprise a control element 640 which may be one of the control elements described above with reference to the four embodiments. Thus, the control element 640 may be external to the luminous module 100, 300, 400, 500. Alternatively, it may be internal to the luminous module 100, 300, 400, 500, as described above.

The control element 640 may comprise a processor configured to communicate unidirectionally or bidirectionally, via one or more buses or via a wired connection, with a memory such as a random access memory (RAM) or a read only memory (ROM) or any other type of memory (flash, EEPROM, etc.). Alternatively, the memory comprises several memories of the aforementioned types. Preferably, the memory is non-volatile memory. The processor is adapted to execute instructions, stored in the memory, for implementing one or more animations as a function of the receipt of animation commands, or for controlling the projection of patterns as a function of touch input data from the touch-sensitive layer 610 described below. Alternatively, the processor may be replaced by a microcontroller designed and configured to implement one or more animations as a function of the receipt of animation commands, or to control the projection of patterns as a function of touch input data from the touch-sensitive layer 610 described below.

Optionally, the interior equipment 600 may further comprise a touch-sensitive layer 610 adapted to receive a touch input from a user. No restriction is imposed on this touch input, which may be a tap, tap and hold, flick, swipe, two-finger tap, pinch to zoom in or out, two consecutive taps, or any other type of touch input.

There is also no restriction on the technology associated with the touch-sensitive layer 610, which may for example be of capacitive type. Alternatively, the touch-sensitive layer 610 is of resistive type. Such technologies are well known and are not described in more detail in the present description.

The luminous module 100, 300, 400, 500 is adapted to form one or more patterns 630 comprising a first symbol 631, such as the + sign, and a second symbol 632, such as the − sign. Such examples of patterns are given purely for illustrative purposes, as explained above.

Depending on the embodiment in question, the pattern 630 may be projected by one or more flexible guide sheets:

in the first embodiment, the pattern 630 is formed by a single flexible guide sheet of a luminous module 100;

in the second embodiment, the pattern 630 is formed by a single flexible guide sheet of a luminous module 300, but each symbol 631 and 632 may be projected by selective injection into two injection elements opposite distinct sections of the edge of the flexible guide sheet, in such a way as to project the symbols 631 and 632 in two distinct areas. The pattern projected may thus include one symbol, the other symbol, both symbols or no symbol. More generally, the selective injection into one, the other or both injection elements makes it possible to dynamically vary the pattern 630 projected;

in the third embodiment, the pattern 630 is formed by superposition of at least two flexible guide sheets of a luminous module 400. According to a first example, each flexible guide sheet produces the same pattern 630, but in different colors, which makes it possible to dynamically vary the colors. According to a second example, a first flexible guide sheet is adapted to project the first symbol 631 according to a first color, and the second flexible guide sheet is adapted to project the second symbol 632 according to a second color, identical to or different from the first color, and the injection of light is selectively controlled between the two flexible guide sheets, in such a way as to dynamically vary the pattern 630 projected, as in the second embodiment;

in the fourth embodiment, the pattern 630 is formed by a matrix of at least two flexible guide sheets next to one another. Thus, according to a first example, a first flexible guide sheet projects the first symbol 631 and a second flexible guide sheet projects the second symbol 632. Alternatively, the luminous module 500 comprises more than two flexible guide sheets, and each flexible guide sheet is adapted to project a part of the symbols 631 and 632. For example, each symbol may be produced by four flexible guide sheets.

When several symbols are formed by the pattern 630, as is the case in FIG. 6, each symbol may be projected in a given area of the luminous module 100, 300, 400, 500. The first symbol 631 may be projected in a first given area of the luminous module, located on the right, and the second symbol 632 may be projected in a second given area of the luminous module, located on the left.

According to an embodiment, the touch-sensitive layer 610 may comprise touch-sensitive areas corresponding respectively to the first and second given areas. Thus, a first touch-sensitive area may be superimposed with the first given area and a second touch-sensitive area may be superimposed with the second given area. A touch-sensitive area and a given area of the luminous module may be only partially superimposed.

Thus, a first touch input may be received in the first touch-sensitive area, when the user touches the first symbol 631 and a second touch input may be received when the user touches the second symbol 632. First touch input data are transmitted to the control element 640 when the first touch input is received and second touch input data are transmitted to the control element 640 when the second touch input is received.

The control element 640 is adapted to control the source(s) of the luminous module 100, 300, 400, 500 as a function of the touch input data received. For example:

the control element 640 may vary the luminous intensity of the pattern as a function of the touch input data. For example, the control element increases the luminous intensity of the pattern 630 projected when the first touch input data are received, and decreases the luminous intensity of the pattern 630 projected when the second touch input data are received;

the control element 640 may vary the color of the pattern 630 as a function of the touch input data received;

the control element may activate or deactivate certain light sources as a function of the touch input data received.

Alternatively or in addition, the control element 640 may control another device of the vehicle, not shown in FIG. 6, as a function of the touch input data. For example, the volume of a speaker may be increased or decreased as a function of the touch input data. Alternatively, the temperature of a vehicle air conditioning/heating system may be controlled on the basis of the touch input data received.

More than two symbols in more than two given areas associated with more than two touch-sensitive areas may be provided, and the control element 640 is adapted to control the luminous module 100, 300, 400, 500 or other devices as a function of more than two touch input data.

No restriction is imposed on the type of interior equipment 600 in question.

The interior equipment 600 may for example be a dashboard of an automotive vehicle. For example, it could be a dashboard on the passenger side of an automotive vehicle. The interior equipment 600 may thus advantageously be used to control other devices in the vehicle, such as the heating/air conditioning system or the speakers. In the case where the interior equipment is a dashboard, it may comprise an inflatable safety device, such as an airbag for example, under the external surface 620 of the equipment 600, and not shown in FIG. 6. In this case, as the luminous module comprises one or more thin flexible guide sheets, the luminous module 100, 300, 400, 500 may be torn by the inflatable safety device in the event of an impact of the vehicle, which makes it possible to perform ambient or esthetic luminous functions, or to control devices of the vehicle, without compromising the driving safety feature provided by the inflatable safety device.

The interior equipment 600 may alternatively be a seat for an automotive vehicle, in particular the rear part of the seat, in such a way as to project light toward a rear passenger of the vehicle. The luminous module 100, 300, 400, 500 may be integrated into the back of a seat headrest or into the back of the seat body. Alternatively, the interior equipment 600 may be an automotive vehicle roof or an automotive vehicle rear shelf.

The present invention is not limited to the embodiments described above by way of example; it extends to other variants.

What is claimed is:

1. An interior equipment for an automotive vehicle, the equipment comprising an external surface on which a luminous module is arranged, the luminous module including:

an assembly of at least one flexible guide sheet, each flexible guide sheet of the assembly being adapted to receive light rays via at least one edge of the flexible guide sheet and to reflect the light rays in a direction substantially normal to a surface of the flexible guide sheet according to at least one pattern etched in the flexible guide sheet;

at least one light injection element adapted to receive light and to distribute the light in the assembly of the at least one flexible guide sheet;

at least one light source adapted to inject light into the at least one light injection element; and wherein the assembly of at least one flexible guide sheet includes at least a first flexible guide sheet and a second flexible guide sheet, the first and second flexible guide sheets being placed next to one another such that the first flexible guide sheet is adapted to project a first pattern at a first position in a plane X-Y in which the flexible guide sheets mainly extend, and the second flexible guide sheet is adapted to project a second pattern at a second position in the plane X-Y, the first and second positions being distinct, wherein the at least one light injection element includes a first injection element arranged to inject light into an edge of the first flexible guide sheet and a second injection element arranged to inject light into an edge of the second flexible guide sheet.

2. An interior equipment for an automotive vehicle, the equipment comprising an external surface on which a luminous module is arranged, the luminous module including:

an assembly of at least one flexible guide sheet, each flexible guide sheet of the assembly being adapted to receive light rays via at least one edge of the flexible guide sheet and to reflect the light rays in a direction substantially normal to a surface of the flexible guide sheet according to at least one pattern etched in the flexible guide sheet;

at least one light injection element adapted to receive light and to distribute the light in the assembly of the at least one flexible guide sheet;

at least one light source adapted to inject light into the at least one light injection element; and a touch-sensitive layer adapted to receive a touch input from a user, the touch-sensitive layer being located between the external surface and the luminous module, or under the external surface of the equipment, with the external surface being an interior surface in a passenger compartment of the automotive vehicle.

3. The interior equipment as claimed in claim 2, wherein a control element is adapted to receive touch input data from the touch-sensitive layer and is configured to control the at least one light source as a function of the touch input data.

4. The interior equipment as claimed in claim 3, wherein the luminous module is adapted to display at least one symbol in a given area of the luminous module on the basis of the pattern of each flexible guide sheet of the assembly, and wherein a touch-sensitive area of the touch-sensitive layer opposite the given area of the luminous module is adapted to receive a touch input to generate touch input data as a function of the touch-sensitive area.

5. The interior equipment as claimed in claim 4, wherein the luminous module is adapted to display at least a first symbol in a first given area of the luminous module and at least a second symbol in a second given area of the luminous module, on the basis of the pattern of each flexible guide sheet of the assembly, and wherein a first touch-sensitive area of the touch-sensitive layer is opposite the first given area of the luminous module and a second touch-sensitive area of the touch-sensitive layer is opposite the second given area of the luminous module, wherein a first touch input datum is generated by the touch-sensitive layer upon receipt of a first touch input in the first touch-sensitive area, and wherein a second touch input datum is generated by the touch-sensitive layer upon receipt of a second touch input in the second touch-sensitive area.

6. The interior equipment as claimed in claim 2, wherein the at least one flexible guide sheet includes a flexible guide sheet, the at least one light injection element includes a light injection element, and the at least one light source includes a light source, wherein the light source is adapted to project light in a first wavelength range and in a second wavelength range distinct from the first range, a control element being adapted to control the light source to project light in the first range or in the second range.

7. The interior equipment as claimed in claim 2, wherein the at least one light injection element includes a first injection element and a second injection element, wherein the at least one source is adapted to selectively inject light into the first injection element and into the second injection element, and wherein the first light injection element and the assembly of at least one flexible guide sheet are arranged in such a way as to project light according to a first pattern and wherein the second light injection element and the assembly of at least one flexible guide sheet are arranged in such a way as to project light according to a second pattern.

8. The interior equipment as claimed in claim 7, wherein the at least one light source includes a first light source adapted to inject light into the first light injection element and a second light source adapted to inject light into the second light injection element.

9. The interior equipment as claimed in claim 7, wherein the first injection element is arranged in such a way as to inject light into a first section of the edge of the guide sheet of the assembly, and wherein the second injection element is arranged in such a way as to inject light into a second section of the edge of the flexible guide sheet, a first portion of the flexible guide sheet located opposite the first section of the edge being etched according to the first pattern, and a second portion of the flexible guide sheet located opposite the second section of the edge being etched according to the second pattern.

10. The interior equipment as claimed in claim 7, wherein the at least one flexible guide sheet includes at least a first and a second flexible guide sheets, the first pattern being etched in the first flexible guide sheet and the second pattern being etched in the second flexible guide sheet, the first injection element being arranged in such a way as to inject light into an edge of the first flexible guide sheet and the second injection element being arranged in such a way as to inject light into an edge of the second flexible guide sheet.

11. The interior equipment as claimed in claim 10, wherein the first and second guide sheets are superimposed in the luminous module, in order to project the first and second patterns in a common area of the luminous module.

12. The interior equipment as claimed in claim 10, wherein the first and second flexible guide sheets are placed next to one another in such a way as to project the first and second patterns at distinct positions.

13. The interior equipment as claimed in claim 12, wherein the assembly includes more than two flexible guide sheets placed next to one another in such a way as to form a matrix of flexible guide sheets, each flexible guide sheet being associated with a light injection element adapted to inject light into an edge of the flexible guide sheet and each flexible guide sheet having at least one pattern etched in the sheet.

14. The interior equipment as claimed in claim 2, wherein a control element is adapted to control the at least one source in order to selectively project light according to a first pattern of the at least one pattern and according to a second pattern of the at least one pattern.

15. The interior equipment as claimed in claim 14, wherein the control element is adapted to dynamically control the at least one source in such a way as to produce a light animation comprising at least the first and second patterns.

16. The interior equipment as claimed in claim 2, wherein each flexible guide sheet of the assembly has a thickness of between 0.2 and 1 mm.

17. The interior equipment as claimed in claim 2, wherein at least one flexible guide sheet of the assembly is made of a transparent material.

18. The interior equipment as claimed in claim 2, wherein each flexible guide sheet includes a film including microstructures, in which each pattern of a first and a second pattern is etched by ultraviolet printing of the microstructures of the film.

19. The interior equipment as claimed in claim 18, wherein for each flexible guide sheet, a surface density of microstructures increases with the distance from the edge of the guide sheet into which the light is injected.

20. The interior equipment as claimed in claim 2, wherein each injection element includes a plurality of injection guides, each injection guide being adapted to receive light from one end of the guide and to guide the light to a given longitudinal position on the injection element, the longitudinal positions of the injection guides all being different so as to distribute the light longitudinally in the injection element.

* * * * *